United States Patent [19]
Thum

[11] Patent Number: 5,224,574
[45] Date of Patent: Jul. 6, 1993

[54] DEFORMATION STRUCTURE, IN PARTICULAR FOR A MOTOR VEHICLE

[75] Inventor: Holger M. Thum, Braunschweig, Fed. Rep. of Germany

[73] Assignee: Volkswagen AG, Wolfsburg, Fed. Rep. of Germany

[21] Appl. No.: 849,517

[22] Filed: Mar. 11, 1992

[30] Foreign Application Priority Data

Mar. 16, 1991 [DE] Fed. Rep. of Germany ....... 4108680
Aug. 19, 1991 [DE] Fed. Rep. of Germany ....... 4127381
Sep. 20, 1991 [DE] Fed. Rep. of Germany ....... 4131372

[51] Int. Cl.⁵ .......................... F16F 7/12; B62D 1/19
[52] U.S. Cl. ................................ 188/371; 188/377; 280/777; 296/188; 296/189
[58] Field of Search ................. 188/371, 376, 377; 280/777; 293/133; 296/188, 189

[56] References Cited

U.S. PATENT DOCUMENTS

| | | | |
|---|---|---|---|
| 3,508,633 | 4/1970 | Nishimura et al. | 280/777 X |
| 3,511,345 | 5/1970 | Takamatsu et al. | 188/371 |
| 3,599,757 | 8/1971 | Takamatsu et al. | 188/371 |
| 4,023,652 | 5/1977 | Torke | 188/377 |
| 4,086,825 | 5/1978 | Badcock et al. | 280/777 X |
| 4,531,619 | 7/1985 | Eckels | 188/371 |
| 5,033,593 | 7/1991 | Kazuhito | 188/377 |

FOREIGN PATENT DOCUMENTS

| | | | |
|---|---|---|---|
| 965684 | 4/1975 | Canada | 280/777 |
| 1172558 | 7/1960 | Fed. Rep. of Germany . | |

Primary Examiner—Matthew C. Graham
Assistant Examiner—Peter M. Poon
Attorney, Agent, or Firm—Brumbaugh, Graves, Donohue & Raymond

[57] ABSTRACT

A deformation structure includes a hollow member and a tapered deformation member having a smaller diameter than the hollow member and arranged to be inverted into the hollow member in response to an applied force. The hollow member has a pleat-denting response to higher applied forces so that the pleat engages the surface of the inverted deformation member within the hollow member.

9 Claims, 4 Drawing Sheets

DEFORMATION STRUCTURE, IN PARTICULAR FOR A MOTOR VEHICLE

BACKGROUND OF THE INVENTION

This invention relates to energy-absorbing deformation structures which include a hollow member and a deformation member of smaller diameter arranged to be deformed into the hollow member upon application of deforming force. Structures of this type are employed, for example, at the ends of longitudinal members of a motor vehicle.

Such deformation structures are disclosed in U.S. Pat. No. 3,599,757 and German Patent No. 1 172 558. Those deformation structures include a hollow member having a substantially more rugged configuration than the deformation member. Consequently, only the deformation member is available for conversion of kinetic energy into deformation work by inverting itself into a double walled projection within the hollow member. Moreover, difficulties may arise in this deformation if the deforming force is not applied in the direction of the longitudinal axis of the structure.

SUMMARY OF THE INVENTION

Accordingly, it is an object of the present invention to provide a deformation structure of the above type which overcomes the disadvantages of the prior art.

Another object of the invention is to provide such a deformation structure which converts a larger proportion of the kinetic energy into deformation work by being crushed, or shortened, and which is effective without buckling even if the forces applied are offset to a certain extent from its longitudinal axis.

These and other objects of the invention are attained by providing a deformation structure which includes a hollow member capable of pleat-denting under longitudinal stress and a deformation member at one end of the hollow member having a shape which tapers down to a smaller size in the direction away from the hollow member.

With this arrangement, in addition to deforming the deformation member, an applied force will deform the hollow member as well when the force applied exceeds a predetermined level so that the inverted portion of the deformation member engages an adjacent inner surface of the hollow member and serves as a guide for the hollow member.

According to one embodiment, the deformation member is preshaped so that it projects slightly into the hollow member prior to the application of a deforming force. This promotes the plastic deformation of the deformation member and causes the stress-strain diagram to approach the rectangular ideal. Such a preformed inversion shape also permits connection to an oblique flange of the hollow member.

In another embodiment of the invention, the deformation member and the hollow member have engaging flanges in the form of conical sections which are symmetrical with respect to the longitudinal axis of the structure. By virtue of an oblique orientation of the flanges, the transmission of force into the hollow member is improved and the flange deformations in slight collisions are diminished.

The deformation element may be made of metal or of a tough plastically deformable synthetic material such as polyamide or polyethylene.

The deformation member may have any desired cross-sectional shape, as described in the above-cited U.S. Pat. No. 3,599,757, in particular a non-circular cross section such as a polygonal cross section.

BRIEF DESCRIPTION OF THE DRAWINGS

Further objects of the invention will be apparent from a reading of the following description in conjunction with the accompanying drawings, in which.

DESCRIPTION OF PREFERRED EMBODIMENTS

Figure 1:
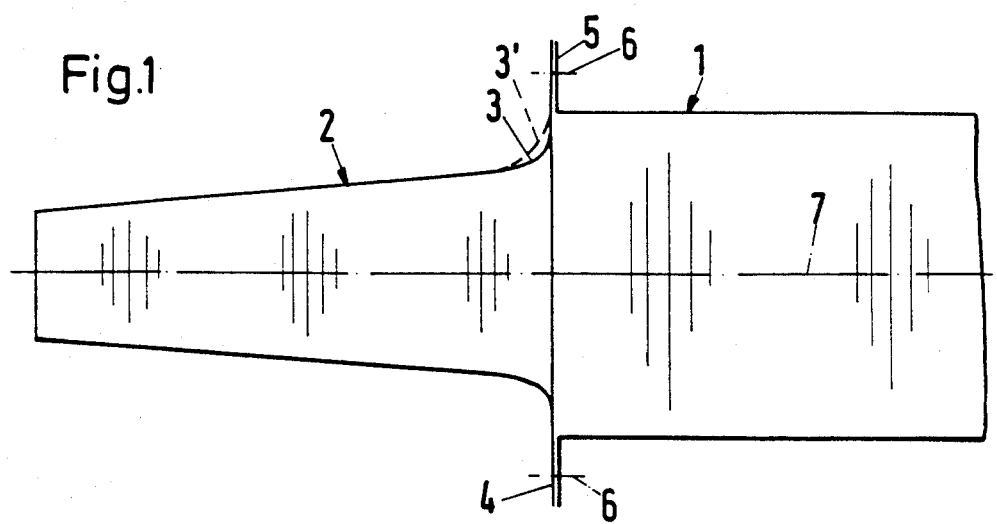
FIG. 1 is a schematic view in longitudinal section illustrating a representative deformation structure according to the invention in its original state.

In the typical embodiment of the invention shown in FIG. 1, a deformation structure consists of a hollow member 1, which is in the form of a pleat-dented beam, and a deformation member 2 having a cross section which tapers down conically with increasing distance from the hollow member 1, i.e., to the left as viewed in FIG. 1. The periphery of the deformation member 2 adjacent to the hollow member 1 has a curved transition 3 leading to an outwardly directed end flange 4 which abuts an end flange 5 of the hollow member 1 and is affixed to it at circumferential attachment points 6 by welding, for example. As is clearly apparent from the drawings, the diameter of the hollow member 1 is greater than the greatest diameter of the deformation member 2 up to the end flange 4. The hollow member 1 may, for example, be an end portion of a longitudinal member of the vehicle which supports a flexurally rigid bumper by way of the deformation member 2. Thus, the deformation member 2 will prevent critical bending stresses from being transmitted from the bumper to the hollow member 1 during a crash.

Figure 2:
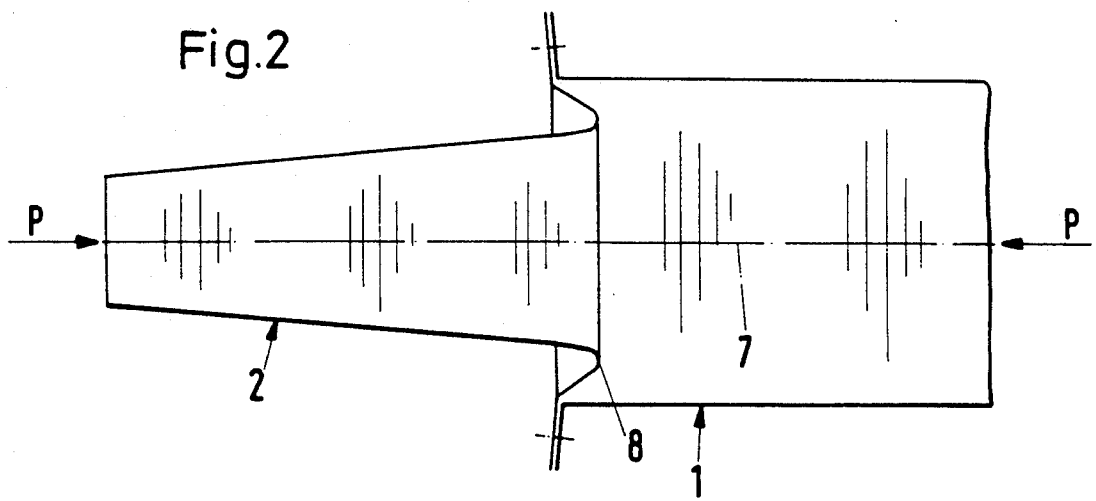
FIG. 2 is a schematic view of the deformation structure shown in FIG. 1 at the beginning of the deformation process.

When a force P is applied to the deformation member 2 substantially in the direction of the longitudinal axis 7 of the deformation member, for example during a crash, the deformation member 2 is forced to telescope into the hollow member 1, forming an inversion zone 8, as shown in FIG. 2.

Figure 3:
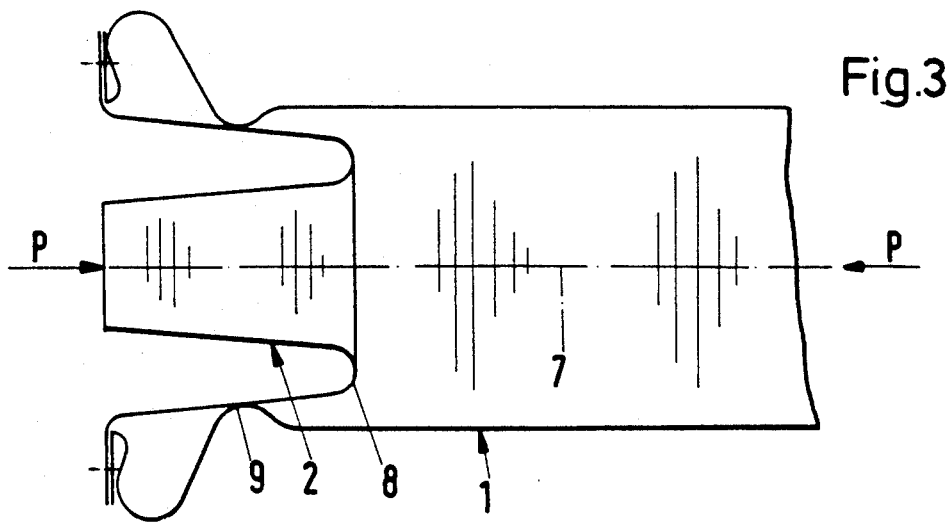
FIG. 3 is a view of the same structure shown in FIGS. 1 and 2 in the deformed state.

As a comparison of FIGS. 2 and 3 shows, the inversion zone 8 will move inwardly into the hollow member 1 during the crash and, when a selected minimum force in the axial direction is exceeded, the hollow member 1 will form one or more pleats 9 at its left-hand end as shown in the drawings. As a result, at least one inwardly bent pleat 9 will engage the outer surface of the inverted deformation member 2 in the transverse direction.

Figure 4:
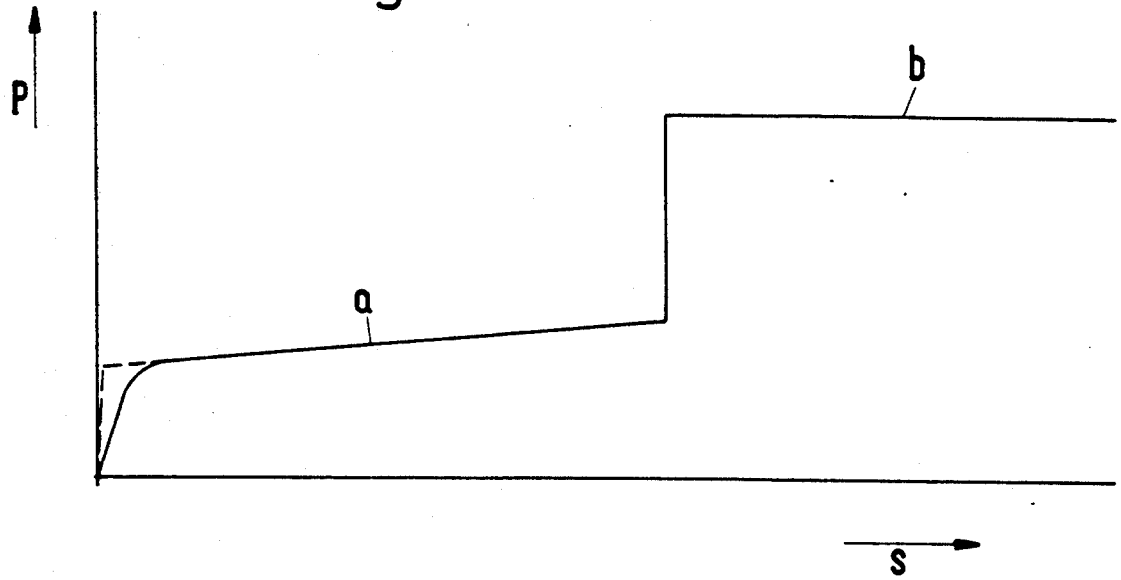
FIG. 4 is a graphical representation showing the stress-strain diagram for the deformation structure of FIGS. 1-3.

The force-distance relation during the deformation process is illustrated in FIG. 4 in terms of the applied force P and the shortening s of the deformation structure. As soon as the force P exceeds a minimum value, inverting deformation of the member 2 commences with a gradual increase in stress as shown by the curve a. Upon completion of this inverting process and upon application of a greater force P, dent-pleating of the hollow member 1 takes place in accordance with the curve b. From that point on, the force required for continued deformation is substantially constant.

The initial increase of the force curve shown in FIG. 4 can be influenced by varying the conical angle of the deformation member and/or the radius of the curved transition 3. Thus a curved transition 3' having a greater radius results in a steeper increase of force with deformation distances as shown in the dotted line curve in FIG. 4.

Figure 5:
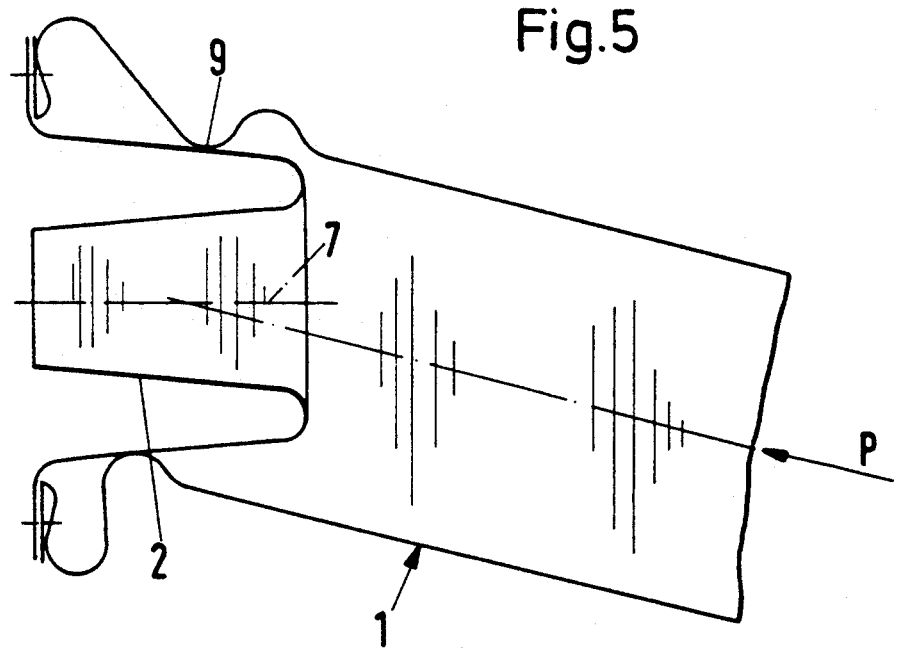
FIG. 5 is a schematic view illustrating the deformation structure of FIG. 1 following deformation by a force applied in the oblique direction.

As previously noted, the hollow member 1 when deformed has at least one pleat 9 which engages the outer periphery of the inverted deformation member 1. FIG. 5 shows that, because of this pleat deformation, buckling of the hollow member 1 is avoided when a force P is applied in a direction oblique to the longitudinal axis 7 of the deformation member.

Figure 6:
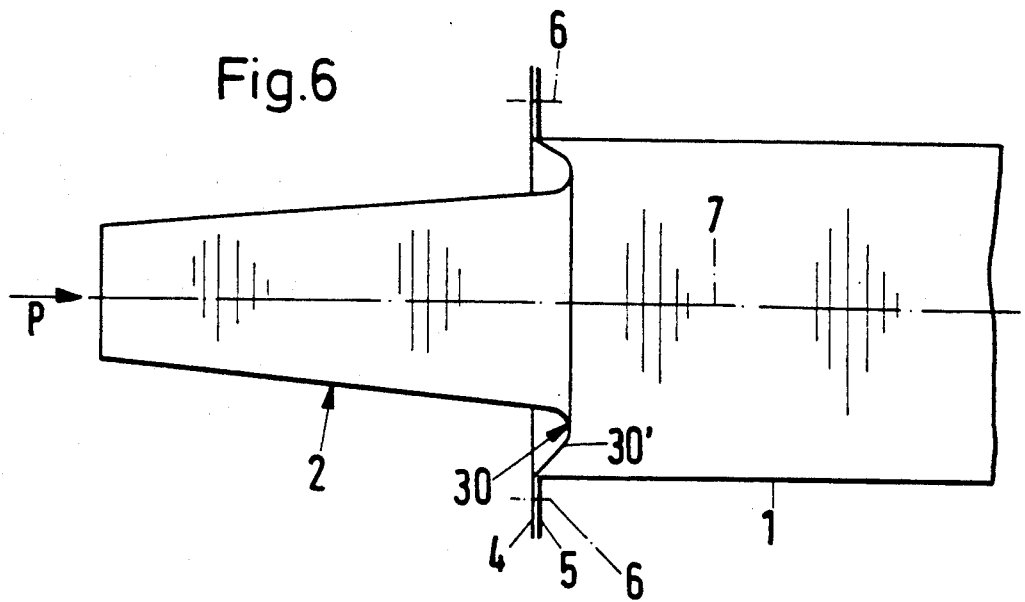
FIGS. 6 and 7 are schematic views in longitudinal section showing further embodiments of the invention prior to application of a deforming force.
Figure 8:
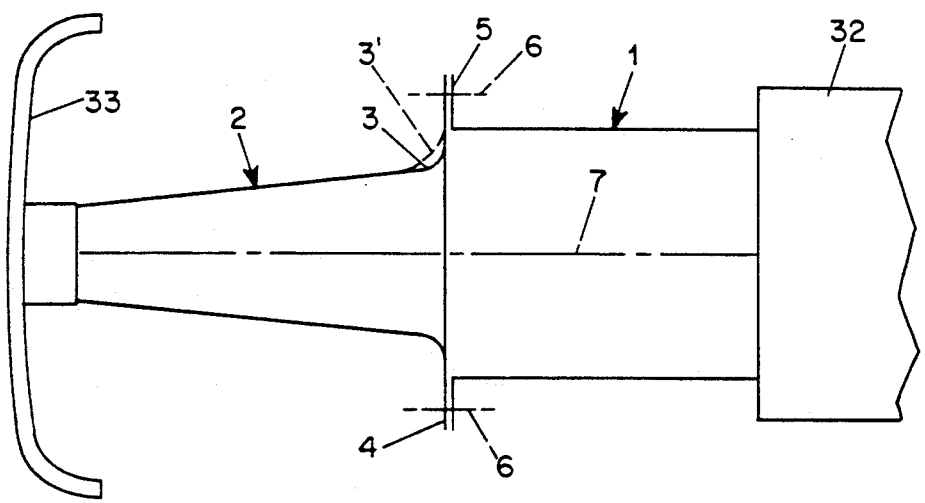
FIG. 8 is a schematic longitudinal sectional view showing the use of a deformation member according to the invention for the mounting of a bumper to a longitudinal member of a vehicle.

In the embodiment shown in FIG. 6, a deformation structure also consists of a hollow member 1 in the form of a pleat-dented beam and a deformation member 2 having a cross section which tapers down conically with increasing distance from the hollow member 1, i.e. to the left in the drawing. In this case, however, the deformation member 2 includes a pre-formed inversion zone 30, having a straight portion 30' connected to the flange 4, which extends from the flange inwardly into the end of the hollow member 1. Thus, in longitudinal section, the portion 30 is a circular arc-shaped region and the portion 30' is a linear extension connecting the portion 30 to the flange 4. As in the embodiment previously described, the flange 4 abuts the flange 5 of the hollow member 1 and is affixed thereto at circumferential attachment points 6 by welding or bolting, for example. It is readily apparent that the diameter of the hollow member 1 is greater than the largest diameter of the deformation member 2. As shown in FIG. 8, the hollow member 1 may constitute an end portion of a longitudinal member 32 of the vehicle on which a flexurally rigid bumper 33 is mounted by way of the deformation member 2. The deformation member 2 will then prevent critical bending stresses from being applied to the hollow member 1 from the bumper 33 during a crash.

Upon application of a force P substantially in the direction of the longitudinal axis 7 of the deformation member, for example in a crash, the deformation member 2 is caused to telescope into the hollow member 1, moving the inversion zone 30 farther into the hollow member 1.

As previously explained, the inversion zone 30 first moves into the interior of the hollow member 1 and then, when a predetermined level of force in the axial direction is exceeded, dent-pleating of the hollow member 1 will commence, beginning at its left-hand end as viewed in the drawing. Thereafter, at least one inwardly directed pleat 9 will engage the outer surface of the deformable member 2 in the transverse direction.

By providing the pre-formed inversion zone 30, the transition to plastic deformation of the deformation member 2 is improved, and the form of the stress-strain diagram approaches the rectangular ideal. Moreover, the portion 30' ensures good adherence of the curved preformed zone 30 to the flanges 4 and 5 which are oblique to the longitudinal axis 7.

Figure 7:
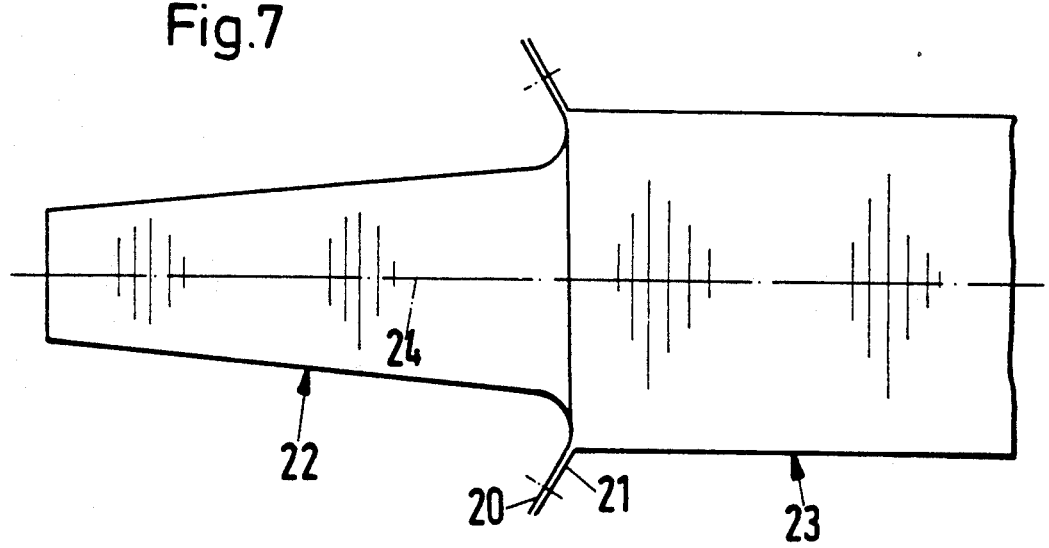

In the embodiment shown in FIG. 7, a deformation member 22 and a hollow member 23 have corresponding flanges 20 and 21, respectively, which are segments of conical surfaces symmetrically oriented with respect to the longitudinal axis 24, and having vertices inside the hollow member 23. With this arrangement, the transmission of force into the hollow member is improved and flange deformations in slight collisions are decreased.

Figure 9:
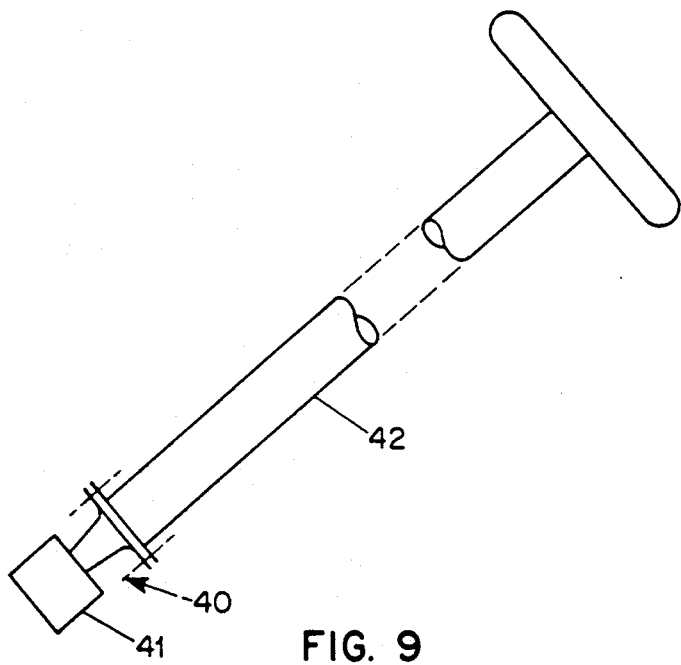
FIGS. 9 and 10 are schematic views showing the use of a deformation structure according to the invention in the steering arrangement for a motor vehicle.

A preferred application of the deformation structure, shown in FIG. 9, is an energy absorber 40 disposed between the steering gear 41 and the steering column 42 of a motor vehicle steering system. In this case, the steering column is connected at the left and the steering gear is connected at the right of the deformation structure 40 which may consist of any of the structures shown in the illustrated examples in FIGS. 1, 6 and 7. Use of the invention in this manner provides the advantage of assuring axial steering column guidance even during deformation of the steering column, since no asymmetrical buckling will occur.

Figure 10:
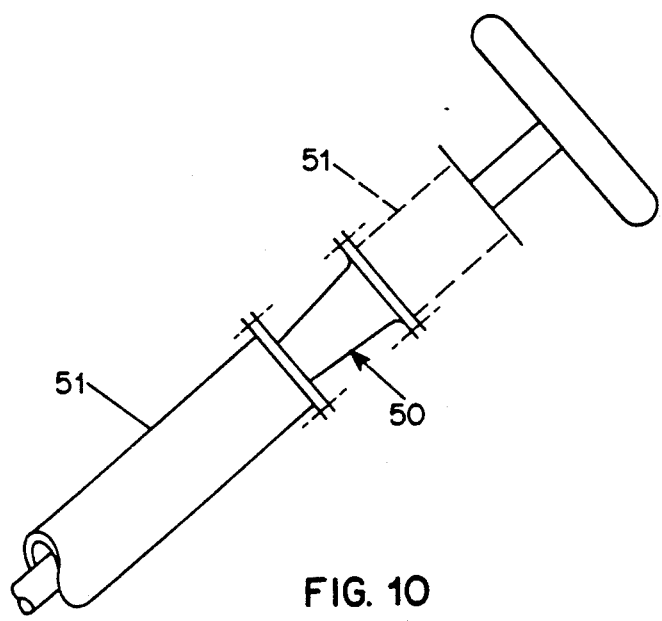

As shown in FIG. 10, the use of a deformation structure 50 as part of a tubular steering column housing 51 is also possible.

The deformation structure of the invention may be made by simple deep drawing of sheet metal, by flaring of a tube, or by injection molding of plastic. By virtue of high stability of shape and high absorption of energy during deformation, the deformation member may be of very lightweight construction.

The invention thus provides deformation structures which assure effective conversion of kinetic energy into deformation work, especially in the direction of deformation, and are also capable of absorbing forces applied in a direction oblique to the longitudinal axis.

Although the invention has been described herein with reference to specific embodiments, many modifications and variations therein will readily occur to those skilled in the art. Accordingly, all such variations and modifications are included within the intended scope of the invention.

I claim:

1. A deformation structure comprising a hollow member having a pleat-denting structure and an outwardly directed flange at one end and a tubular deformation member of smaller diameter than the hollow member having one end affixed to the flange of the hollow member and having a body which tapers down in the direction away from the hollow member, whereby upon application of a deforming force directed substantially in the axial direction of the structure, the deformation member will be inverted within the hollow member and the outer surface of the inverted portion will engage at least one pleat formed by deformation of the hollow member.

2. A deformation structure according to claim 1 wherein the deformation member has an outwardly-directed flange by which it is affixed to the flange of the hollow member.

3. A deformation structure according to claim 2 wherein the flange of the deformation member is joined to the body of the deformation member by a curved transition portion.

4. A deformation element according to claim 2 wherein the flanges of the hollow member and the deformation member have the shape of conical segments which are longitudinally symmetrical with respect to the longitudinal axis of the structure.

5. A deformation structure according to claim 1 mounted between a steering gear and a steering column of a motor vehicle.

6. A deformation structure according to claim 1 wherein the hollow member is a longitudinal member of a motor vehicle and the deformation member provides a limitedly articulated connection to a transverse bumper.

7. A deformation structure according to claim 1 inserted in a tubular housing accommodating a steering column of a motor vehicle.

8. A deformation structure according to claim 1 wherein the deformation member includes a preformed deformation zone extending into the hollow member.

9. A deformation structure according to claim 8 wherein the deformation member is connected to the hollow member by a pre-formed deformation zone which, in longitudinal section, has the shape of a circular arc and a linear extension of the arc.

* * * * *